J. KAJIURA.
ELECTRIC TELEGRAPHY.
APPLICATION FILED APR. 4, 1910.
977,879.
Patented Dec. 6, 1910.
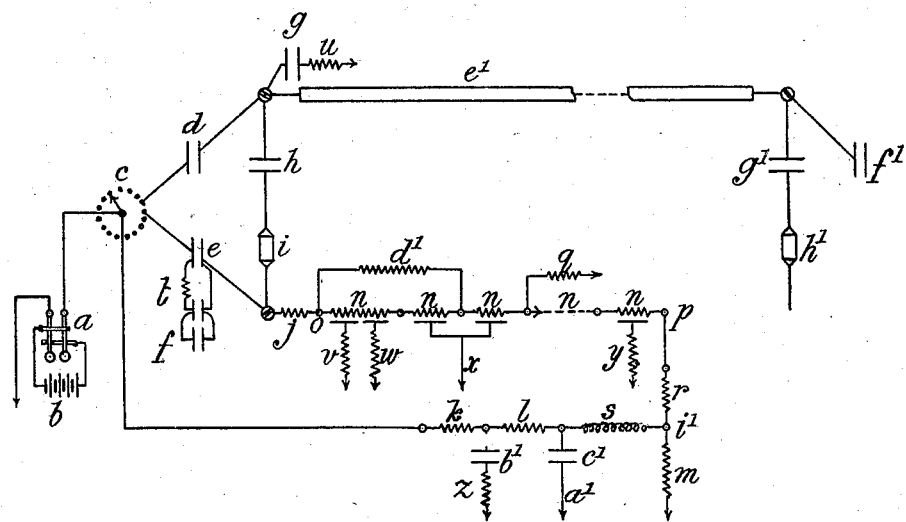
Witnesses:
Inventor:
Juzo Kajiura.
By Spear, Middleton,
Donaldson & Spear
Attorneys.

UNITED STATES PATENT OFFICE.

JUZO KAJIURA, OF TOKYO, JAPAN.

ELECTRIC TELEGRAPHY.

977,879.  Specification of Letters Patent.  Patented Dec. 6, 1910.

Application filed April 4, 1910. Serial No. 553,415.

*To all whom it may concern:*

Be it known that I, JUZO KAJIURA, subject of the Emperor of Japan, and residing at No. 22 Shinsakamachi Akasaka, Tokyo, Japan, have invented certain new and useful Improvements in Electric Telegraphy, of which the following is a specification.

This invention, which I may term the "semi-bridge duplex," relates to a duplex system to be used upon cable and other telegraphic circuits containing or not containing overhead bare wires; one object being to effect economy by reducing the number or capacity of the artificial cables required, as compared with ordinary "duplex" systems, while another object is to enable exact "duplex" balancing to be more easily and rapidly attained, and thereby to increase the working capacity of cable circuits.

When a sending battery is applied to one of the block condensers which are interposed at the ends of a line cable, the cable would ultimately attain, throughout the whole length, a certain potential which is determined by the voltage used, and the capacity of the cable itself and of the block condensers; this potential is hereinafter termed the "ultimate potential." The "ultimate potential" is by no means established at once; on the contrary, not only is there always a lapse of time before the cable attains the "ultimate potential," but the rise and fall of potential in relation to time is not the same at all parts of the cable. At the ends of the cable circuit a considerable period of time must elapse before the "ultimate potential" is reached, while there is always a certain intermediate position where the required duration of time is much shorter and the rise and fall of potential in relation to time can be imitated by a suitable simple means without resorting to artificial cables corresponding to that portion of line cable lying beyond the said position. This intermediate position, which is hereinafter termed the "intermediate position," is generally at or near the electrical center of the circuit. It will thus be seen that if only such artificial cables as correspond to that portion of line cable lying between the home end and the "intermediate position" be used, and a suitable means, which can be made to imitate the rise and fall of potential in relation to time at the "intermediate position" of the cable, be provided at the end of the section of artificial cable used, an exact duplex balance can be obtained, there being no need to use so much artificial cable as corresponds to the whole or nearly whole length of the line as is done in ordinary duplex systems.

This invention is based on the principle explained above.

In carrying out this invention, in a "duplex" system, such as described with reference to the accompanying diagram, there is provided a means of imitating the rise or fall of potential in relation to time caused at a certain convenient intermediate position of line cable by a sending battery at the home station, and artificial cables corresponding to the line cable distant from or beyond the "intermediate position" of such line cable are dispensed with, the artificial cables required being only those corresponding to the line cable up to the "intermediate position." It is convenient, in carrying out this invention, to employ such connection and arrangement of self-inductances, resistances and capacities as herein described and shown in the diagram as a means to imitate at the "intermediate position" of line cable the rise and fall of potential in relation to time caused by a sending battery at the home station.

In order that this invention may be clearly understood and readily carried into effect, it will now be described with reference to the accompanying diagram which shows an embodiment thereof as applied to an ordinary cable circuit.

In the diagram, $a$ represents a key or automatic transmitter; $b$ battery; $c$ balancing rheostat; $d$ and $e$ block condensers; $f$ slide condenser; $g$ small adjustable condenser; $h$ receiving condenser; $i$ receiving instrument: $j, k, l$ and $m$, resistances; $n$ artificial cables of which $o$ and $p$ are the beginning and end respectively; $q$ leak resistance; $r$ resistance containing or not containing self-inductance; $s$ adjustable self-inductance; $t, u, v, w, x, y, z, a'$, retardation resistances of which $x$ and $a'$ are instances of no resistance; $b'$ and $c'$ adjustable condensers; $d'$ shunt of artificial cables; $e'$ line cable; $f', g'$ and $h'$ block condenser, receiving condenser, and receiving instrument respectively at the distant end of the cable circuit. The duplex arrangement at the distant end of the cable circuit should be the same as at the home station shown in the left hand side of the diagram, but for the sake of simplicity it is much abbreviated.

The artificial cables $n$ from $o$ to $p$ correspond to that portion of the line cable lying between its left end and the "intermediate position," and the resistances of the parts of the circuit $k, l, s, m$, branching from the center of the balancing rheostat $c$ are so adjusted that the potential of $i'$ is equal to the "ultimate potential" of the line cable; and in order to make the relation of time and the rise or fall of potential of $i'$ so connected to the artificial cable, similar to that at the "intermediate position" of the line cable, an adjustable self-inductance $s$ and capacities $b', c'$, with or without retardation resistances, are introduced into the circuit, and in some cases a simple resistance or resistance having more or less self-inductance is inserted between $p$ and $i'$.

In the accompanying diagram are shown two capacities $b', c'$ and the two resistances $k, l$, but generally one capacity and one resistance there are sufficient for the purpose explained, although there are some cases where it is found better or convenient to use more finely divided capacities and resistances or to use a short section of artificial cable instead of capacities and resistances.

In the accompanying diagram principal parts only are shown and it will be understood that in some cases other resistances, capacities and self-inductances which are not shown in the diagram may be added according to the nature of the cable circuit.

Those parts which are not specially explained above, such as shunt or retardation resistances of artificial cables, etc., have the same function as in ordinary duplex systems, and they are to be modified so as to suit the nature of the cable circuit.

When proper adjustments are made on different parts of the "semi-bridge duplex," the rise or fall of potential in relation to time caused by the sending battery at the home station, will be exactly similar in both the artificial cable and that part of the line cable which lies between the home end and the "intermediate position," so that no potential difference is created between the two sides of the receiving instrument of the home station when that station sends signals, while the instrument faithfully responds to signals sent from the distant station.

With ordinary duplex systems, it is sometimes found difficult or very tedious to get exact duplex balance, but with the "semi-bridge duplex" it is much easier in most cases, and thereby the working capacity of cable circuits is increased; moreover the "semi-bridge duplex" requires only about one half of the artificial cables used in ordinary duplex systems, thereby saving much expense and space.

I claim:

1. In systems of electric telegraphy, the combination with an artificial line corresponding to that portion of line cable lying between the home end and a certain convenient intermediate position thereof, of means branching from the center of the balancing rheostat and adapted to imitate the rise and fall of potential in relation to time at the said intermediate position of line cable caused by a sending battery at the home station.

2. In systems of electric telegraphy, the combination with an artificial line corresponding to that portion of line cable lying between the home end and the "intermediate position" thereof, of an arrangement of self-inductances, resistances and capacities branching from the center of the balancing rheostat and adapted to imitate the rise and fall of potential in relation to time at the said "intermediate position" of line cable caused by a sending battery at the home station.

3. In systems of electric telegraphy, the combination with a portion of artificial line connected up at its near end in the usual manner, of another retardation circuit connected at one end to the center of the balancing rheostat and at the other end to the far end of the said portion of artificial line, said other retardation circuit being adapted to imitate the rise and fall of potential in relation to time at a certain convenient intermediate position of line cable caused by a sending battery at the home station.

4. In systems of electric telegraphy, the combination with a portion of artificial line connected up at its near end in the usual manner, of an arrangement of self-inductances, resistances and capacities connected at one end to the center of the balancing rheostat and at the other end to the far end of the said portion of artificial line, said other retardation circuit being adapted to imitate the rise and fall of potential in relation to time at the "intermediate position" of line cable caused by a sending battery at the home station.

In witness whereof I have hereunto set my hand in the presence of two witnesses.

JUZO KAJIURA.

Witnesses:
W. A. HEANNY,
GENJI KURIBARA.